United States Patent
Van Den Berg et al.

(10) Patent No.: US 7,299,766 B2
(45) Date of Patent: Nov. 27, 2007

(54) FLUID-APPLYING DEVICE AND A METHOD OF APPLYING A FLUID TO A TEAT OF A DAIRY ANIMAL

(75) Inventors: Karel Van Den Berg, Bleskensgraaf (NL); Eduard Lodewijk Meijer, The Hague (NL); Cornelis Antonius Maria Snijders, Teteringen (NL); Geert Cornelis Steen, Maasland (NL)

(73) Assignee: Lely Enterprises AG, Zug (CH)

( * ) Notice: Subject to any disclaimer, the term of this patent is extended or adjusted under 35 U.S.C. 154(b) by 74 days.

(21) Appl. No.: 10/952,888

(22) Filed: Sep. 30, 2004

(65) Prior Publication Data

US 2005/0066903 A1    Mar. 31, 2005

(30) Foreign Application Priority Data

Sep. 30, 2003   (NL) .................................... 1024402

(51) Int. Cl.
*A01J 5/00* (2006.01)
*A01K 13/00* (2006.01)

(52) U.S. Cl. ..................... 119/14.02; 119/651; 119/670

(58) Field of Classification Search ............... 119/651, 119/14.14, 14.02, 14.18, 14.08, 14.01, 14.03, 119/14.04, 650, 665, 670, 671
See application file for complete search history.

(56) References Cited

U.S. PATENT DOCUMENTS

| | | | | |
|---|---|---|---|---|
| 5,666,903 A | * | 9/1997 | Bull et al. ............... | 119/14.01 |
| 5,862,776 A | * | 1/1999 | van den Berg ............ | 119/14.1 |
| 5,979,359 A | * | 11/1999 | Hansson ................... | 119/14.08 |
| 6,055,930 A | | 5/2000 | Stein et al. | |
| 6,457,655 B1 | * | 10/2002 | Reighard et al. ............... | 239/8 |
| 6,550,420 B1 | * | 4/2003 | Bjork ...................... | 119/14.47 |

FOREIGN PATENT DOCUMENTS

EP    1166625 A1    1/2002

* cited by examiner

*Primary Examiner*—Son T. Nguyen
(74) *Attorney, Agent, or Firm*—David P. Owen; Howrey LLP

(57) ABSTRACT

A fluid-applying device for applying a fluid to a teat of a dairy animal. The fluid-applying device comprises a fluid detector for determining a fluid application pattern of the fluid on the teat of the dairy animal. The fluid detector comprises a computer loaded with comparing software for comparing the determined fluid application pattern with a previously stored reference criterion, for emitting a comparison signal which is indicative of the comparison result, and for determining the teat length, the tip of the teat, and the fluid application distance, measured from the tip of the teat, over which the fluid has been applied to the teat, and for emitting a fluid signal comprising data in relation to the determined fluid application distance. The reference criterion may be a threshold distance with which the determined fluid application distance is compared.

9 Claims, 6 Drawing Sheets

FLUID-APPLYING DEVICE AND A METHOD OF APPLYING A FLUID TO A TEAT OF A DAIRY ANIMAL

CROSS REFERENCE TO RELATED APPLICATIONS

This application claims priority from Dutch application number NL1024402 filed on 30th Sep. 2003, the contents of which are hereby incorporated by reference in their entirety.

BACKGROUND OF THE INVENTION

1. Field of the Invention

The invention relates generally to a fluid-applying device for applying a fluid to a teat of a dairy animal. The invention also relates to a method of applying a fluid to a teat of a dairy animal.

2. Description of the Related Art

Devices are known for applying liquids such as cleaning fluids and disinfectants to the teats of dairy animals. In particular devices are known in which a movable robot arm is provided with applying members that are suitable for automatically applying a fluid to the teats. Under the control of a computer the robot arm selects a proper applying member from various possible applying members for applying different application fluids, moves them to a proper application position and applies the fluid. Such devices often constitutes a part of an automatic milking device. The selection of the applying member may be influenced by the teat condition, for example established by means of a camera, and/or environmental conditions. Such a device is known from European Patent Application No EP-1166625 A1.

Other devices are known for applying liquid to a teat as a position indicator in order to aid in the location of the teat. In such devices, a sensor may be adapted to sense the position of the position indicator, a control unit may be adapted to respond to a signal from the sensor, and actuators may be adapted to move a device in relation to the body of the animal in response to the signal from the control unit. U.S. Pat. No. 6,055,930 describes a device of this type which serves for improving the success rate of automatically finding a teat of an animal.

Although known devices may function satisfactorily in general, the application of fluid to a teat of a dairy animal may not always be completed in an altogether satisfactory manner. This is of particular importance in maintaining the health and cleanliness of dairy animals, particularly in the case of automatic milking devices where the presence of the farmer is minimized.

BRIEF SUMMARY OF THE INVENTION

The present invention addresses these problems by providing a fluid-applying device for applying a fluid to a teat of a dairy animal, comprising a fluid detector for determining a fluid application pattern of the fluid on the teat of the dairy animal and a comparing device for comparing the determined fluid application pattern with a previously stored reference criterion and for emitting a comparison signal indicative of the comparison result. In this manner, greater reliability in the correct performance of the application of the fluid.

The invention is based in particular on the insight that checking the performance of the application of the fluid is essential to an efficient, reliable and secure fluid application. The presence of fluid on at least the teat tip comprising the orifice of the teat and an area of some magnitude thereabove is determined by the comparison, of the determined fluid application pattern with a previously stored reference criterion, which comparison may be performed by a computer constituting part of the fluid detector. The computer may determine the fluid application distance, measured from the tip of the teat, over which the fluid has been applied to the teat and emits a fluid signal comprising data based on the determined fluid application distance.

By thus checking the fluid application it is possible, in case of insufficient presence or absence of a fluid on a teat, to take appropriate corrective action. In this manner it is possible to improve not only the health of the teat but also the milk yield of the dairy animal.

According to a preferred embodiment the fluid detector comprises a measurement device for determining a teat length, a position of a tip of the teat and for determining a fluid application distance, measured from the tip of the teat, over which the fluid has been applied to the teat. In this case, the reference criterion may comprise a threshold distance with which the determined fluid application distance is compared. Alternatively, the reference criterion may comprises a predetermined ratio of the fluid application distance and the teat length. Such a threshold ratio may be inputted beforehand and may be adjustable, if desired, in order to accept a desired degree of fluid application as sufficient.

In one embodiment of a device according to the invention, the ratio is approximately 2/3. In most cases it has been found that a threshold ratio of approximately ⅔ is a sufficient criterion for obtaining a correct amount of fluid to the teat.

In an embodiment of a device according to the invention the fluid detector determines, with the aid of the determined fluid application pattern, the presence of the fluid on the teat within a prescribed fluid application circumferential surface over which the fluid has been applied to the teat, and in that the reference criterion comprises a prescribed circumferential distance. By additionally checking the fluid application circumferential surface relative to the checking of the realised fluid application distance, the operational reliability of the fluid-applying device is still further increased. It is known per se to manually apply a fluid to a teat. One method is by dipping the teat into a fluid. In this situation the operator does not check whether or not sufficient fluid is applied on the complete circumference of the teat. Another method is by spraying fluid onto the teat. Also in this case the operator does not check whether or not sufficient fluid is applied on the complete circumference of the teat. In the latter case it is even difficult for the operator to check whether or not sufficient fluid is applied to the teat at all. Consequently the present invention is more than just automating the manual method but in addition provides an objective and reproducible manner for checking the amount of fluid applied to the teat.

In a further embodiment of a device according to the invention the fluid-applying device further comprises a moveable arm and a fluid-applying member located on the arm. Preferably, the device also comprises a control unit for moving the arm to a second fluid application position and for controlling the fluid-applying member in the second fluid application position on the basis of the comparison signal or the fluid signal. In an embodiment of the invention, the initiation for moving the arm with the fluid-applying member to the second fluid application position and the control of the fluid-applying member in the second fluid application take place during the application of the fluid in a first fluid application position. Relative to checking of the fluid application distance or the fluid application circumferential surface after a complete fluid application treatment of a teat has ended, in the aforementioned situation there is achieved a considerable gain of time. Of course, this does not exclude checking of the fluid application distance or the fluid application circumferential surface after a complete fluid application treatment of a teat has ended.

In an embodiment of a device according to the invention, the fluid detector is provided with a laser apparatus for directing a laser beam to the teat, with a laser beam detector for detecting the laser beam reflected by the teat and for emitting a laser beam signal, and with a computer loaded with laser-beam-comparing software for comparing the laser beam signal with a previously stored reference criterion and for emitting a comparison signal forming at least a part of the fluid signal, which comparison signal is indicative of the comparison result.

In another embodiment of a device according to the invention, the fluid detector is provided with a picture-recording device, for example a camera, for recording a picture of a fluid application pattern on the teat and with a computer loaded with picture-comparing software for comparing the recorded picture with a previously stored reference criterion and for emitting a comparison signal which is indicative of the comparison result. The embodiments of the above-mentioned fluid detectors have appeared to be extremely efficient in determining the presence of fluid on a teat. However, it will be obvious that also other fluid detectors, for example comprising devices transmitting ultrasonic or infrared signals, may be applied within the scope of the invention. In an embodiment of a device according to the invention, the fluid detector and the picture-recording device are integrated. Alternatively, the fluid detector and the laser apparatus are integrated.

In another embodiment of a device according to the invention, the device is provided with a colorant-adding device for adding a colorant to the fluid, and the fluid detector comprises a colour-measuring device for measuring a colour of the teat and for emitting a colour signal, which colour signal forms at least a part of the fluid signal. The detection of the presence of fluid can take place in an accurate and simple manner by colour measurement. In an embodiment of a device according to the invention, the colour-measuring device and the picture-recording device are integrated. Alternatively, the colour-measuring device and the laser apparatus are integrated.

In another embodiment of a device according to the invention, the device is provided with a glossy-substance-adding device for adding a glossy substance to the fluid, and the detector comprises a gloss-measuring device for measuring a gloss of the teat and for emitting a gloss signal, which gloss signal forms at least a part of the fluid signal. The detection of fluid can thus take place in a simple manner by detecting the gloss. In an embodiment of a device according to the invention, the gloss-measuring device and the picture-recording device are integrated. In an alternative embodiment, the gloss-measuring device and the laser apparatus are integrated. Viewed in a larger context it is obvious that all substances that improve the detection of fluid applied to a part of the dairy animal are applicable in an embodiment of a device according to the invention.

In another embodiment of a device according to the invention, the device for applying a fluid to a teat of a dairy animal is a device for applying a disinfectant fluid to a teat of a dairy animal. In particular when disinfecting teats it is of utmost importance to be able to detect the presence of disinfectant fluid on the teat in order to be able to demonstrate that the disinfection has been carried out correctly. Alternatively or additionally, the device for applying a fluid to a teat of a dairy animal is a device for applying a cleaning fluid to a teat of a dairy animal. In particular when cleaning teats it is of utmost importance to be able to detect the presence of cleaning fluid on the teat in order to be able to demonstrate that the cleaning has been carried out correctly.

In yet another embodiment of a device according to the invention, the device is provided with a drop detector for detecting a drop of the fluid on the tip of the teat of the dairy animal and for emitting a drop signal, which drop signal forms at least a part of the fluid signal. From the presence of a drop hanging from the teat tip it can be deduced that the fluid has been applied correctly to the teat. In an embodiment of a device according to the invention, the drop detector and the picture-recording device are integrated. In an alternative embodiment, the drop detector and the laser apparatus are integrated.

In a further embodiment of a device according to the invention, the device is provided with a spraying device for applying a fluid to the teat of a dairy animal by spraying. Spraying of fluid appears to provide a reproducible way of applying the fluid.

In a yet further embodiment of a device according to the invention, the device is provided with a spray pattern detector for detecting a spray pattern originating from the spraying device and for emitting a spray pattern signal, which spray pattern signal forms at least a part of the fluid signal. This makes it possible to detect whether the spraying device functions properly. In an embodiment of a device according to the invention, the spray pattern detector and the picture-recording device are integrated.

In another alternative embodiment of a device according to the invention, the spray pattern detector and the laser apparatus are integrated.

In yet another alternative embodiment of a device according to the invention, the device is provided with a teat detector for detecting the teat and for emitting a teat signal, which teat signal forms at least a part of the fluid signal. Such a teat detector only needs to be able to detect the teat and does not have to determine particular properties of the teat or its position. In particular if the data from the spray pattern detector and the teat detector are combined, it is possible to determine whether the spray pattern actually reaches the teat.

In a preferred embodiment of a device according to the invention, the teat detector is provided with a position-measuring device for measuring the position of the teat and for emitting a teat position signal. An accurate application while using a small amount of fluid is now possible. In an embodiment of a device according to the invention, the teat detector and the picture-recording device are integrated. In an alternative embodiment, the teat detector and the laser apparatus are integrated.

In another embodiment of a device according to the invention, the device is provided with a teat condition detector for detecting a teat condition of the teat and for emitting a teat condition signal. In an embodiment of a device according to the invention, the teat condition detector and the picture-recording device are integrated. In an alternative embodiment, the teat condition detector and the laser apparatus are integrated. Such a teat condition signal may be used inter alia for applying a fluid in dependence on the teat condition.

In another embodiment of a device according to the invention, the device is provided with a teat orifice condition detector for detecting a teat orifice condition of the orifice of the teat and for emitting a teat orifice condition signal. In an embodiment of a device according to the invention, the teat orifice condition detector and the picture-recording device are integrated. In an alternative embodiment of a device according to the invention, the teat orifice condition detector and the laser apparatus are integrated. Such a teat orifice condition signal may be used inter alia for applying a fluid in dependence on the teat orifice condition, which may differ from the teat condition.

In another embodiment of a device according to the invention in which the device is provided with a control unit for controlling the device, the control unit controls the device with the aid of the fluid signal.

In a preferred embodiment of a device according to the invention, the device is suitable for performing the application of the fluid to the teat in various ways of performing and the control unit is suitable for selecting one of the ways of performing with the aid of a signal. In an embodiment of a device according to the invention, the control unit is suitable for selecting one of the ways of performing with the aid of the fluid signal.

In an embodiment of a device according to the invention, the control unit is suitable for selecting one of the ways of performing with the aid of the teat position signal. Such a way of performing may comprise for example tilting a spraying element or increasing a spraying pressure in dependence on the measured position.

In a further embodiment of a device according to the invention, the control unit is suitable for selecting one of the ways of performing with the aid of the teat condition signal. Such a way of performing may comprise the selection of a prolonged application time or the selection of a different fluid.

In an embodiment of a device according to the invention, the control unit is suitable for selecting one of the ways of performing with the aid of the teat orifice condition signal. Such a way of performing may comprise the selection of a prolonged application time or the selection of a different fluid.

In an embodiment of a device according to the invention, the control unit is suitable for selecting, with the aid of a signal, a way of performing that comprises the repeat application of the fluid in the same way of performing. This makes it possible to repeat the application if the signal indicates that at a previous application insufficient fluid has been applied.

In an embodiment of a device according to the invention, the control unit is suitable for selecting, with the aid of a signal, a way of performing that comprises first applying, at least once, fluid to the teat in a first way of performing and subsequently applying, at least once, fluid to the teat in a second way of performing, the first and the second way of performing differing from each other. The first way of performing may comprise for example a standard application step in which fluid is applied in a standard manner, whereas the second way of performing comprises for example first determining the position of the teat and moving the applying member to the teat on the basis of the determined position in order to increase the chance that the fluid will get on the teat.

In an embodiment of a device according to the invention, the device is provided with a stock detector for detecting the stock of fluid and for emitting a stock signal. Said stock signal may be used as an indication that the stock has to be replenished.

In an embodiment of a device according to the invention, the spraying device comprises a spraying line and the stock detector is suitable for detecting a stock of fluid in the spraying line. In this manner it is possible to check whether fluid is flowing through the spraying line.

In an embodiment of a device according to the invention, the device is suitable for applying a fluid to a teat of a dairy animal after a dairy animal has been milked, the position-measuring device being suitable for obtaining and emitting a position signal that corresponds to the teat position prior to the milking, the control unit being suitable for moving the applying member from an inoperative position to a fluid application position only with the aid of the position signal that corresponds to the teat position prior to the milking. It has been found that the teat position remains almost unchanged during the milking, and therefore, contrary to the expectations, for a correct application of the fluid it is not necessary to measure the teat position again after the milking and prior to the application of the fluid.

In an embodiment of a device according to the invention, the control unit comprises a calculating device for performing an arithmetic operation on the position signal, the control unit being suitable for moving the applying member with the aid of the arithmetically operated position signal. It has been found that with certain cows or cow species a small change in the teat position occurs prior to and after the milking. By performing an arithmetic operation said change can be determined immediately after the measurement before the milking, so that another measurement after the milking is not necessary.

In an embodiment of a device according to the invention for applying a fluid to a dairy animal having a left rear teat and a right rear teat and having a left front teat and a right front teat, the position-measuring device is suitable for generating four relevant teat position signals, the calculating device is suitable for determining, on the basis of the four teat position signals, a first centre between the left teats, a second centre between the right teats, a third centre between the rear teats and a fourth centre between the front teats, for determining a first plane of symmetry comprising the first and the second centre, and for determining a second plane of symmetry comprising the third and the fourth centre, the planes of symmetry extending at any rate at least substantially parallel to the teats.

In an embodiment of a device according to the invention, the calculating device is suitable for determining the distance from the teat positions to one plane of symmetry or for determining the distances to two planes of symmetry.

In a further embodiment of a device according to the invention, the control unit is suitable for performing as an algorithm a multiplication of the distance by a factor for obtaining an arithmetically operated position signal. For treating the teats of a dairy animal after the milking the teat positions relative to the planes of symmetry are required. It has been found that with certain cows or cow species a small change in the teat position occurs during the milking. By performing an arithmetic operation said change can be determined immediately after the measurement before the milking, so that another measurement after the milking is not necessary.

In a further embodiment of a device according to the invention, the distance is a perpendicular distance between an individual teat position and a relevant plane of symmetry. Performing as an algorithm a multiplication of the perpendicular distance by a factor can be chosen by the control unit in dependence on the identified animal. A value lying between approximately 0.8 and approximately 0.85 appears to be workable with the customary dairy cows.

In a further embodiment of a device according to the invention, the mentioned factor is lying between approximately 0.7 and approximately 0.95. Such a multiplication factor appears to indicate accurately the change of the teat positions for almost all cows and cow species during the milking.

In an embodiment of a device according to the invention, the device is provided with an animal identification system for establishing an animal identity, the animal identification system being connected to the control unit. The calculating device is preferably suitable for performing various arithmetic operations, and the control unit is suitable for selecting one of the arithmetic operations on the basis of the established animal identity. This makes it possible to select an algorithm, for example a multiplication factor, per dairy animal or per animal species or per group of dairy animals.

In an embodiment of a device according to the invention, the control unit is provided with an input device for animal related treatment data. Said treatment data may contain in a manner known per se the lactation stage, milk yield data and the like.

In an embodiment of a device according to the invention, the device is suitable for applying fluids with different chemical and/or physical properties, the control unit selecting, depending on the determined animal identity, a fluid to be applied having a particular chemical and/or physical property.

In an embodiment of a device according to the invention, the device is provided with a detector for detecting the functioning of the applying member, which detector is connectable to the control unit. Such a detector may comprise for example the above-mentioned spray pattern detector or stock detector.

In an embodiment of a device according to the invention, the device is provided with a heating and/or cooling device for setting the temperature of the fluid. Said cooling device may take into account for example the ambient temperature or the established animal identity for setting the temperature.

In an embodiment of a device according to the invention, the device comprises one or more applying members belonging to the group consisting of: brush, roller, spraying element, dipping device.

In an embodiment of a device according to the invention, the applying member comprises a first and a second brush or roller, which are each rotatable about an at least substantially horizontal first axis respectively second axis, the first and the second axis extending at least substantially parallel to each other, a teat-receiving space for receiving the teat being provided between the two brushes. An extremely correct positioning of the brushes or rollers is achieved if the teat detector comprises a main detecting direction, which main detecting direction is capable of being brought at least substantially parallel to a horizontal axis.

In an embodiment of a device according to the invention, the applying member comprises a spraying element that is rotatable under the control of the control unit about an axis extending through the longitudinal direction of the teat. In this manner it can be achieved that fluid is applied to the entire circumferential surface of the teat.

In an embodiment of a device according to the invention, the applying device comprises at least three spraying elements disposed about an axis extending through the longitudinal direction of the teat. In this manner it can be achieved that fluid is applied to the entire circumferential surface of the teat.

The invention also relates to a method of applying a fluid to a teat of a dairy animal using a fluid-applying device, the method comprising: determining a fluid application pattern of the fluid on the teat of the dairy animal; comparing the determined fluid application pattern with a previously stored reference criterion; and emitting a comparison signal indicative of the comparison result.

In an embodiment of the method according to the invention, the method additionally comprises determining a teat length, a position of a tip of the teat and a fluid application distance, measured from the tip of the teat, over which the fluid has been applied to the teat. In this case the reference criterion may comprise a threshold distance with which the determined fluid application distance is compared. The reference criterion may comprise a predetermined ratio of the fluid application distance and the teat length. In an embodiment of a method according to the invention, said ratio is approximately 2/3.

In one embodiment of a method according to the invention, the method further comprises determining, with the aid of the determined fluid application pattern, the presence of the fluid on the teat within a prescribed fluid application circumferential surface over which the fluid has been applied to the teat, and in that the reference criterion comprises a prescribed circumferential distance. The method may further comprise emitting a fluid signal, the fluid signal comprising data in relation to the presence of fluid on the teat within the prescribed fluid application circumferential surface.

In an embodiment of a method according to the invention, the fluid-applying device comprises a fluid-applying member located on a moveable arm and the method comprises applying fluid to the teat at a first fluid application position.

According to a further embodiment, the method further comprises moving the arm with the fluid-applying member to a second fluid application position and controlling the fluid-applying member in the second fluid application position on the basis of the comparison signal or the fluid application pattern or the fluid signal.

In another embodiment of a method according to the invention, the step of detecting fluid on the teat comprises the step of directing a laser beam to the teat, the step of detecting the laser beam reflected by the teat, the step of emitting a laser beam signal, the step of comparing the laser beam signal with a previously stored reference criterion and the step of emitting a comparison signal forming at least a part of the fluid signal, which comparison signal is indicative of the comparison result.

In an embodiment of a method according to the invention, the step of detecting fluid on the teat comprises the step of recording a picture of a fluid pattern on the teat, the step of comparing the recorded picture with a previously stored reference criterion and the step of emitting a comparison signal forming at least a part of the fluid signal, which comparison signal is indicative of the comparison result.

In another embodiment of a method according to the invention, the method comprises the step of adding a colorant to the fluid, the step of measuring a colour of the teat and the step of emitting a colour signal, which colour signal forms at least a part of the fluid signal.

In another embodiment of a method according to the invention, the method comprises the step of adding a glossy substance to the fluid, the step of measuring a gloss of the teat, and the step of emitting a gloss signal, which gloss signal forms at least a part of the fluid signal.

In another embodiment of a method according to the invention, the step of applying a fluid to a teat of a dairy animal comprises the step of applying a disinfectant fluid to the teat.

In another embodiment of a method according to the invention, the step of applying a fluid to a teat of a dairy animal comprises the step of applying a cleaning fluid to the teat.

In another embodiment of a method according to the invention, the method comprises the step of detecting a drop of the fluid on the tip of the teat of the dairy animal and the step of emitting a drop signal, which drop signal forms at least a part of the fluid signal.

In another embodiment of a method according to the invention, the step of applying a fluid comprises the step of applying a fluid to the teat of a dairy animal by spraying.

In another embodiment of a method according to the invention, the method comprises the step of detecting a spray pattern originating from the spraying device and the step of emitting a spray pattern signal, which spray pattern signal forms at least a part of the fluid signal.

In another embodiment of a method according to the invention, the method comprises the step of detecting the teat and the step of emitting a teat signal, which teat signal forms at least a part of the fluid signal.

In another embodiment of a method according to the invention, the step of detecting the teat comprises the step of measuring the position of the teat and the step of emitting a teat position signal.

In another embodiment of a method according to the invention, the method comprises the step of detecting a teat condition of the teat and the step of emitting a teat condition signal.

In another embodiment of a method according to the invention, the method comprises the step of detecting a teat orifice condition of the orifice of the teat and the step of emitting a teat orifice condition signal.

In another embodiment of a method according to the invention, the method comprises the step of controlling the device with the aid of the fluid signal.

In another embodiment of a method according to the invention, the method comprises the step of selecting with the aid of a signal one from a number of ways of performing for performing the application of a fluid to the teat.

In another embodiment of a method according to the invention, the method comprises the step of selecting a way of performing on the basis of one or more of the signals belonging to the group consisting of the fluid signal, the teat position signal, the teat condition signal and the teat orifice condition signal.

In another embodiment of a method according to the invention, the method comprises the step of repeating one way of performing of the application of the fluid.

In another embodiment of a method according to the invention, the method comprises the step of first applying, at least once, fluid to the teat in a first way of performing and subsequently applying, at least once, fluid to the teat in a second way of performing, the first and the second way of performing differing from each other.

In another embodiment of a method according to the invention, the method comprises the step of detecting the stock of fluid and the step of emitting a stock signal.

In another embodiment of a method according to the invention, the method comprises the step of detecting the stock of fluid in a spraying line and the step of emitting a stock signal.

In another embodiment of a method according to the invention, the method comprises the step of applying a fluid to a teat of a dairy animal by means of an applying member after a dairy animal has been milked, the step of determining the position of the teat prior to the milking and the step of moving the applying member only with the aid of the determined teat position prior to the milking.

In another embodiment of a method according to the invention, the method comprises the step of performing an arithmetic operation on the determined teat position prior to the milking, the step of moving the applying member with the aid of the determined teat position being performed only with the aid of the arithmetically operated teat position.

In another embodiment of a method according to the invention, the method is applied to a dairy animal having a left rear teat and a right rear teat and having a left front teat and a right front teat, the method comprising the step of determining the teat position of the four teats prior to the milking, the step of determining a first centre between the left teats, a second centre between the right teats, a third centre between the rear teats and a fourth centre between the front teats, the step of determining a first plane of symmetry comprising the first and the second centre, and the step of determining a second plane of symmetry comprising the third and the fourth centre, the planes of symmetry extending at any rate at least substantially parallel to the teats.

In another embodiment of a method according to the invention, the method comprises the step of determining a distance to the first plane of symmetry and/or a distance to the second plane of symmetry.

In another embodiment of a method according to the invention, the method comprises the step of performing as an algorithm a multiplication of the distance by a factor for obtaining an arithmetically operated position signal.

In another embodiment of a method according to the invention, the distance is a perpendicular distance between an individual teat position and a relevant plane of symmetry.

In another embodiment of a method according to the invention, the factor is lying between approximately 0.7 and approximately 0.95.

In another embodiment of a method according to the invention, the method comprises the step of establishing an animal identity.

In another embodiment of a method according to the invention, the method comprises the step of performing various arithmetic operations and the step of selecting one of the arithmetic operations on the basis of the established animal identity.

In another embodiment of a method according to the invention, the method comprises the step of inputting animal related treatment data.

In another embodiment of a method according to the invention, the method comprises the step of selecting a fluid to be applied having a particular chemical and/or physical property.

In another embodiment of a method according to the invention, the method comprises the step of detecting the functioning of the applying member.

In another embodiment of a method according to the invention, the method comprises the step of setting the temperature of the fluid.

BRIEF DESCRIPTION OF THE DRAWINGS

The features and advantages of the invention will be appreciated upon reference to the following figures of a number of exemplary embodiments, in which.

DESCRIPTION OF ILLUSTRATIVE EMBODIMENTS

Figure 1:
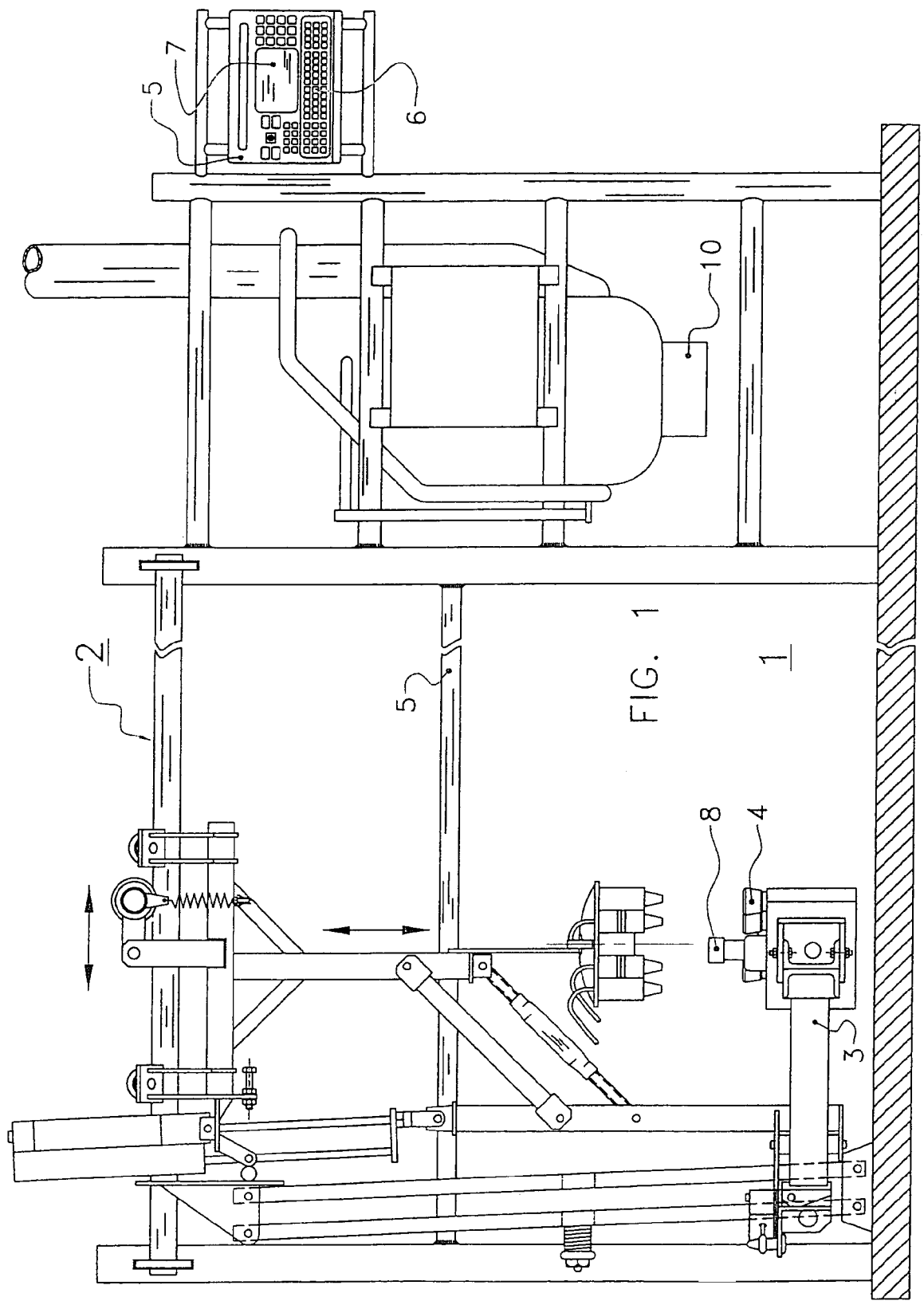
FIG. 1 shows diagrammatically a side view of a device for automatically milking animals, in which a first embodiment of an applying device according to the invention is present in the form of a spraying element.
Figure 2:
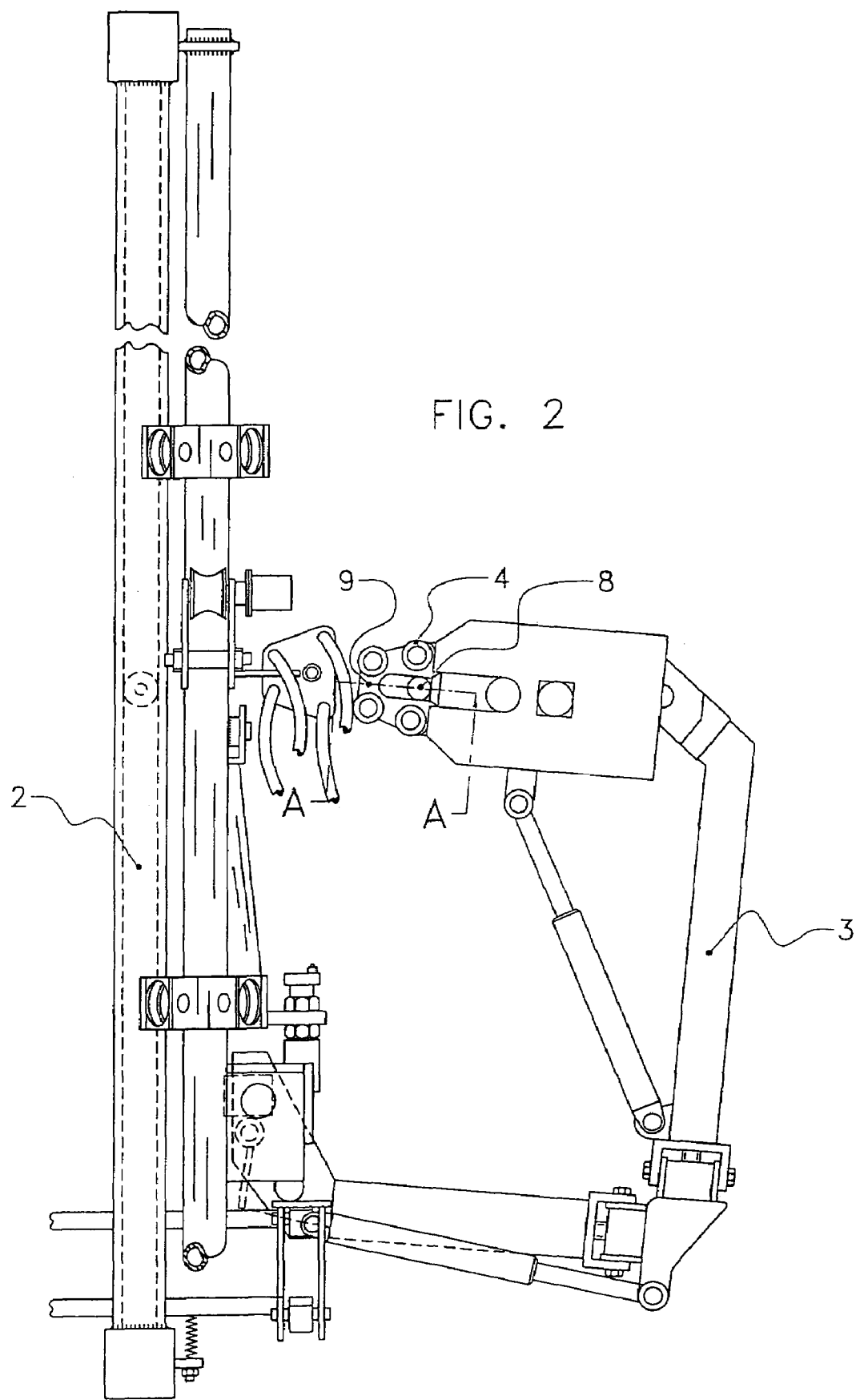
FIG. 2 shows diagrammatically a plan view of a part of the device shown in FIG. 1.

FIGS. 1 and 2 show diagrammatically a device for automatically milking dairy animals. The device comprises a milking parlour 1 surrounded by a fencing 2 that allows a dairy animal, in this embodiment a cow, a limited freedom of movement. The device comprises a robot arm 3 carrying teat cups 4 to be connected to the teats of the cow. The device is controlled by a control unit 5 provided with an input device 6, such as a keyboard, for inputting data and with a screen 7. On the robot arm 3 there is also disposed a teat-position-measuring device 8 for measuring the position of the teats of a cow. The data obtained by the teat-position-measuring device are used by the control unit 5 for moving the robot arm 3 in such a way that the teat cups 4 can be connected to the teats. Such a device is known per se and will not be described here in further detail. It will be obvious that all kinds of position-measuring means known per se, comprising for example lasers, cameras, ultrasonic sensors and the like, may be applied within the scope of the invention. In the embodiment shown, the robot arm carries both the teat cups and the position-measuring device, but it will be obvious that there may also be applied a robot arm with a gripper for gripping teat cups from a storage space. In an alternative embodiment, the position-measuring device may also be arranged on a separate robot arm or even in a fixed place inside or outside the milking parlour 1. There is disposed an animal identification system 10 near the milking parlour 1 for recognizing the identity of a cow present in the milking parlour 1.

As shown in FIG. 2, there is provided between the front teat cups an applying device 9 for applying a fluid to the teats of a cow. In the embodiment shown, the applying device 9 is provided with a spraying element as an applying member. Such a spraying element 9 may be used for applying a fluid (for example a cleaning fluid) prior to the connection of teat cups, i.e. prior to the milking, but may also be used for applying a fluid (for example a disinfectant fluid) after the disconnection of the teat cups, i.e. after the milking. It is pointed out here that within the scope of the invention by milking is meant the drawing of milk during a milking run when the teat cups are connected to the teats. Although the invention will be described with reference to an applying device disposed on the same robot arm as the teat cups and the position-measuring device, it will be obvious that the applying device may also be disposed on a separate robot arm.

Figure 3:
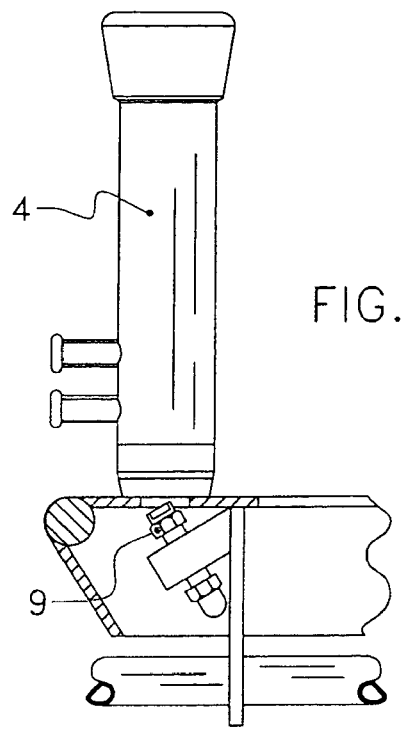
FIG. 3 shows diagrammatically a cross-sectional view according to the line A-A in FIG. 2.

FIG. 3 shows in more detail the position of the spraying element 9 between the teat cups. The spraying element 9 is positioned in such a way that an atomization pattern of the fluid is directed forwardly and upwardly relative to the end of the robot arm 3. Because of the internal constructive design of the spraying element the fluid to be sprayed leaves the spraying element in a conical pattern.

Figure 4:
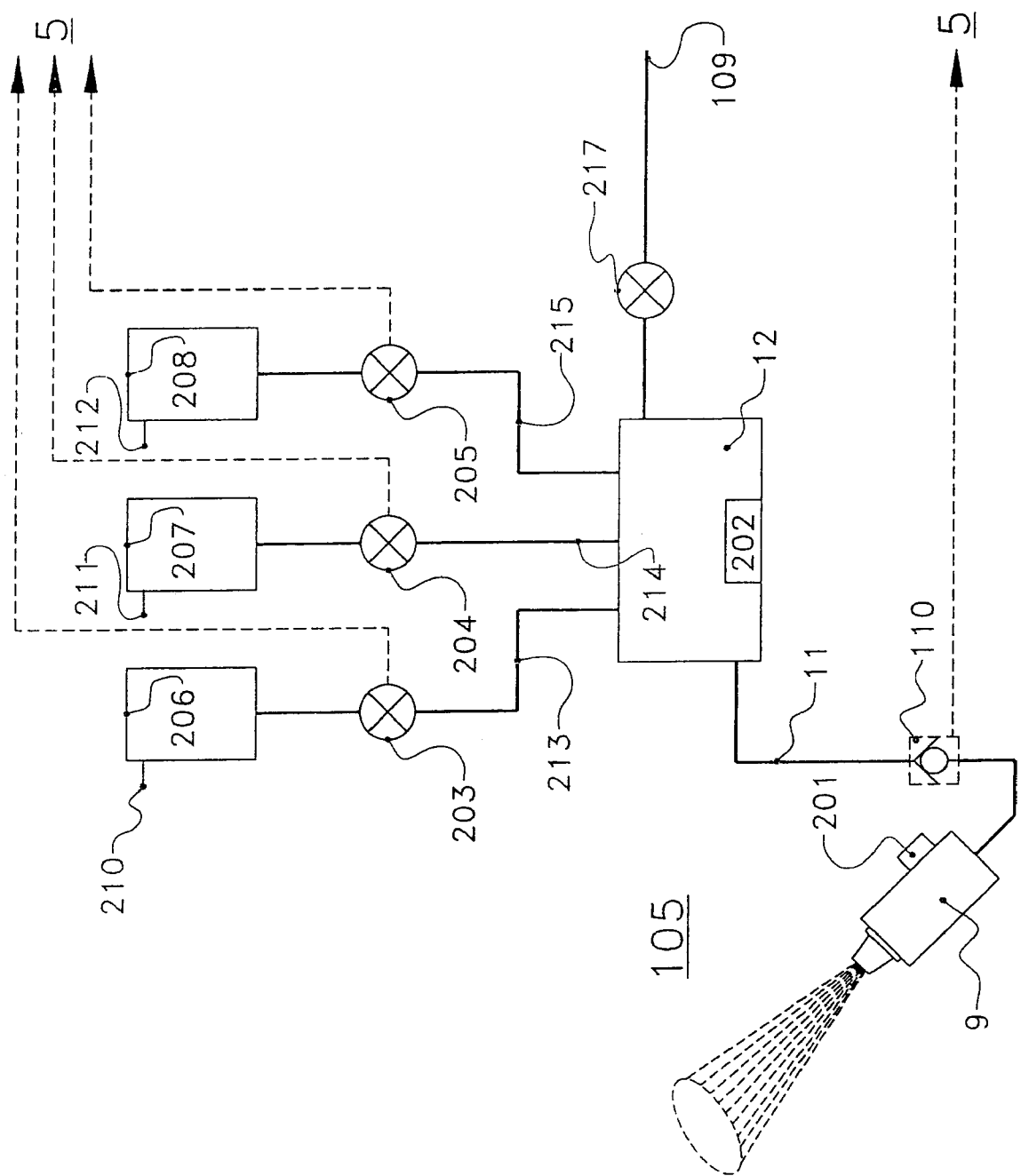
FIG. 4 shows diagrammatically an embodiment of a fluid-applying device.

In FIG. 4 the fluid-applying device is shown diagrammatically. The fluid-applying device comprises a pressure vessel 12, in which the fluid to be applied is stored, as well as a line 11 leading the fluid to the spraying element 9. Valves 203, 204, 205 controlled by the control unit 5 are included in lines 213, 214, 215. The pressure vessel 12 is connected to fluid reservoirs 206, 207, 208 via said lines 213, 214, 215. To the pressure vessel 12 there is connected a line 109 via which overpressure can be applied to the pressure vessel 12 by controlling a valve 217 included in said line in such a way that said valve is opened. The overpressure is applied to the fluid reservoirs 206, 207, 208 via supply lines 210, 211, 212. The overpressure that is present in the pressure vessel 12 preferably amounts to three atmosphere. A valve 110 is included in the supply line 11 to the spraying element 9. The flow of fluid to the spraying element 9 can be blocked or released by means of the valve 110. The valve 110 may be designed for example as an electromagnetic valve. There are provided one or more detectors 201, 202 that detect the functioning of the applying device.

Cow related treatment data may be inputted into the control unit 5 by means of the keyboard 6. With the aid of the animal identification system 10 it is thus possible inter alia to set per cow the composition of the fluid to be applied. If desired, the overpressure, the duration of the treatment and the like may also be adapted in dependence on the inputted data.

For applying a fluid to the teat, the control unit 5 moves the applying member 9 from an inoperative position to a fluid application position. This may take place for example after the milking of the dairy animal. After the teat cups have been disconnected, the control unit 5 guides the applying member 9 to the fluid application position only with the aid of position data obtained prior to the milking, which position data are required for connecting the teat cups to the teats of the cow. For this purpose the control unit activates the sensor prior to the connection for obtaining the position signal that corresponds to the teat position prior to the milking. Alternatively, the sensor may be activated permanently. If said position is used for moving the applying member 9 to the fluid application position, a quick and still accurate way of applying the fluid appears to be obtained. With some cows the position of the teats does not change during the milking and, consequently, the position data obtained prior to the milking can be used without any problem for controlling the applying member. However, with some cows or cow species it is found that the position of the teats does change during the milking. This can be taken into account by providing the control unit 5 with a (non-shown) calculating device that is suitable for performing an arithmetic operation on the position signal (relating to the teat position prior to the milking), the control unit being suitable for moving the applying member with the aid of the arithmetically operated position signal. By means of the keyboard 6 animal related data can be inputted per cow or per group of cows or per cow species in order to select a correct arithmetic operation.

Figure 5:
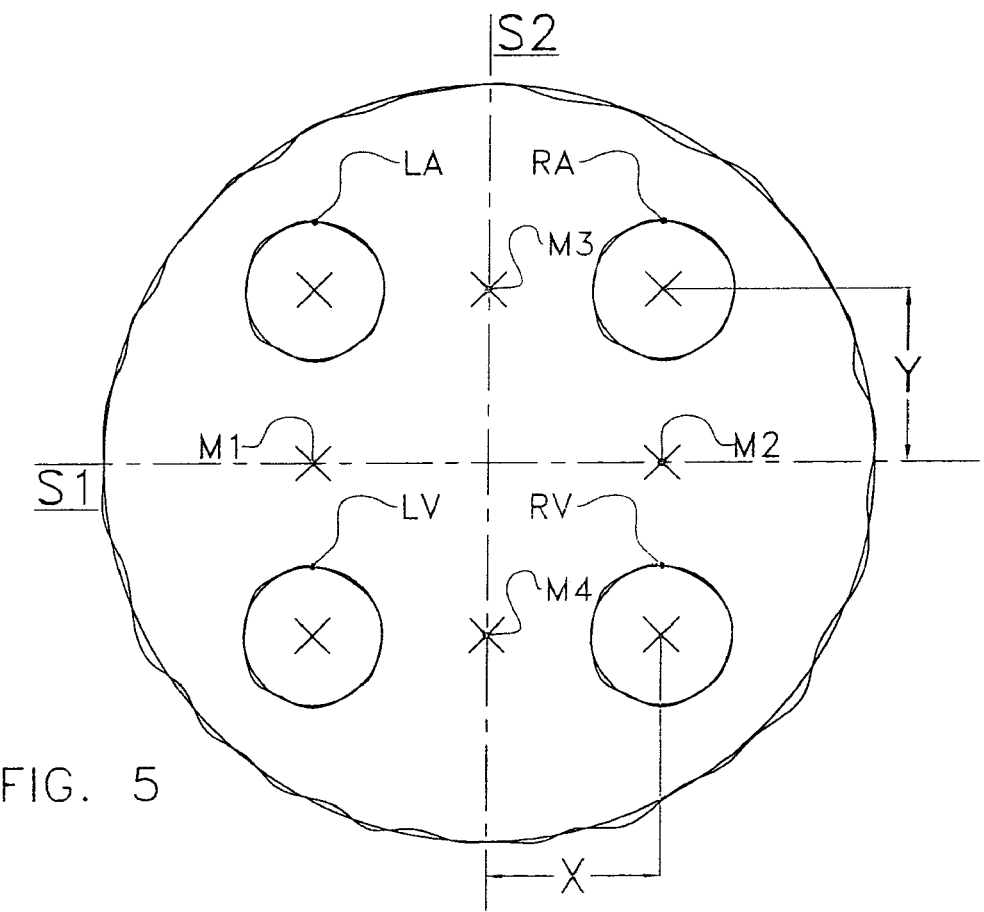
FIG. 5 shows a cross-sectional view of the teats of an udder, and the distances X and Y from the teats to the planes of symmetry S2 and S1.

In a particularly simple embodiment, with a dairy animal having a left rear teat LA (FIG. 5) and a right rear teat RA and having a left front teat LV and a right front teat RV, the position-measuring device generates four relevant teat position signals that correspond to the teat positions prior to the milking. On the basis of the four teat position signals the calculating device determines a first centre M1 between the left teats, a second centre M2 between the right teats, a third centre M3 between the rear teats and a fourth centre M4 between the front teats. The calculating device further determines a first plane of symmetry S1 comprising the first centre M1 and the second centre M2, and a second plane of symmetry S2 comprising the third centre M3 and the fourth centre M4, the planes of symmetry extending at any rate at least substantially parallel to the teats. By determining the perpendicular distance (X and/or Y) between a teat and the relevant plane(s) of symmetry, the change of the teat position during the milking can be taken into account in a simple manner. This is achieved by performing a multiplication of said distance by a factor lying between approximately 0.7 and approximately 0.95 for obtaining the arithmetically operated position signal. The factor or the arithmetic operation can be selected by the control unit in dependence on the identified animal. A value lying between approximately 0.8 and approximately 0.85 appears to be workable with the customary dairy cows.

The application of fluid takes place as follows. The calculating device, constituting part of the control unit 5, has performed an arithmetic operation on the position signals obtained prior to the milking of the cow and corresponding to the positions of the teats. With the aid of these arithmetically operated position signals the robot arm 3, in which the spraying element 9 is disposed, is moved to the first arithmetically determined fluid application position. In the embodiment chosen, a rear teat constitutes the first teat to be treated. After the robot arm 3 has been positioned, the valve 110 is opened for a very short while, so that the relevant teat is enveloped at that moment by a conical atomization pattern of fluid. Owing to the fact that the conical atomization pattern is directed forwardly and upwardly relative to the end of the robot arm 3, spraying fluid is prevented from getting into the teat cups.

The invention relates in particular to the checking of the performed application of the fluid. For this purpose, the device is provided with a fluid detector for detecting fluid on the teat of the dairy animal, and for emitting a fluid signal. In the embodiment shown, said fluid detector is integrated in the position-measuring device 8. The laser apparatus is suitable for directing a laser beam to the teat. A laser beam detector detects the laser beam reflected by the teat and emits a laser beam signal. The detector is further provided with a computer loaded with laser-beam-comparing software for comparing the laser beam signal with a previously stored reference criterion and for emitting a comparison signal which forms at least a part of the fluid signal and which is indicative of the comparison result. It will be obvious that the fluid detector may also be constituted by other devices. In this respect may be taken into account a picture-recording device, for example a camera, for recording a picture of the teat and a computer loaded with picture comparing software for comparing the recorded picture with a previously stored reference criterion and for emitting a comparison signal, forming at least a part of the fluid signal, which comparison signal is indicative of the comparison result. It will be obvious that the fluid detector may also be constituted by other, separate devices functioning in an equal manner. For example, ultrasonic, infrared or optical fluid detectors are suitable for the purpose and may be applied in the present invention.

The position-measuring device 8 may be used for detecting the tip of a teat (although an other device may be used as well for this purpose), the fluid detector being suitable for determining the distance, measured from the tip of the teat, over which the fluid has been applied to the teat, and the fluid signal comprising data in relation to the measured distance. Said measured distance is compared in the calculating device with a threshold distance in order to determine whether the fluid has been applied to a sufficiently large area of the teat. It has been found that a threshold distance of ⅔ of the measured teat length, measured from the tip of the teat, is a reliable criterion for all cows. It is also possible that the fluid detector is suitable for determining, with the aid of the determined fluid application pattern, the presence of the fluid on the teat within a prescribed fluid application circumferential surface over which the fluid has been applied to the teat, the reference criterion comprising a prescribed fluid application circumferential surface with which the determined presence of the fluid on the teat within the prescribed fluid application circumferential surface is comparable. The fluid signal now comprises data in relation to the presence of fluid on the teat within the prescribed fluid application circumferential surface. The control unit is suitable for moving the arm with a fluid-applying member to a second fluid application position and for controlling the fluid-applying member in the second fluid application position on the basis of the comparison signal and/or the fluid signal. If, after or during the second fluid application, it is found on checking that the fluid pattern does not meet the criterion requirements, the arm with the fluid-applying member is moved to a next application position. However, it may suffice only to bring the fluid-applying member into another position or to adapt for example the way of spraying or the like. Subsequently, fluid is again applied to the teat. The procedure is repeated until the criterion has been met. A next teat may now be treated in an analogous manner. Subsequently, the robot arm 3 is moved to a further calculated teat position with the aid of an arithmetically operated position signal, if desired. In the embodiment chosen, the not yet treated rear teat constitutes the second teat to be treated. After the robot arm 3 has been positioned, the valve 110 is again opened for a very short while. The front teat located opposite the latest treated rear teat and the other front teat are successively treated in the same manner. Of course, another sequence of treating the teats is possible. For example, it is possible to treat, alternately, different teats.

The control unit controls the spraying element. The control comprises the positioning in all possible spatial directions of the spraying element per se as well as the selection of a suitable flow of fluid (pulsating or continuous, temperature, pressure level, spread or rather focussed, duration of time, type of fluid, etcetera), originating from an activated spraying element. The control unit is further suitable for activating a warning signal. The latter aspect is relevant as soon as the control unit determines that the fluid application pattern on a teat, after various attempts to meet the criterion requirements, eventually does not meet the criterion requirements. By means of signals the farmer's attention is drawn to the not well functioning of for example the spraying element, so that he is able to take adequate action. In this context possible signals are light and/or sound signals and/or text signals on for example a receiver for electronic signals, such as a mobile telephone.

It will further be obvious that the above-mentioned embodiment of the applying device may be used in a way in which it is integrated with the device for (automatically)

milking animals, as a separate unit in a device for (automatically) milking animals, and as a separate, independently functioning unit.

Owing to the presence of reservoirs 206, 207, 208, it is possible to apply by means of the device fluids with different chemical and/or physical properties, the control unit selecting, depending on the determined animal identity, a fluid to be applied having a particular chemical and/or physical property. In a non-shown alternative embodiment, the device is provided with a heating and/or cooling device for setting the temperature of the fluid. Also in this case it is possible to set the temperature individually per cow.

The detector 201, 202 for detecting the functioning of the applying member is connectable to the control unit, so that action can be taken in dependence on the detection result. The detector 201 may comprise for example a stock detector for detecting the stock of fluid and for emitting a stock signal. The detector 201 may further detect a stock of fluid in the spraying line 11. It is pointed out that these detectors may also be used for applying a fluid to the teat at an other point of time than after the milking, for example also for applying a cleaning fluid prior to the milking.

In order to be able to detect correctly the presence of fluid on the teat, in a non-shown embodiment of a device according to the invention, the device is provided with a colorant-adding device for adding a colorant to the fluid, and the fluid detector comprises a colour-measuring device (preferably constituted by the position-measuring device) for measuring a or the colour of the teat and for emitting a colour signal, which colour signal forms at least a part of the fluid signal.

In a non-shown alternative or additional embodiment, the device is provided with a glossy-substance-adding device for adding a glossy substance to the fluid, and the fluid detector (preferably integrated with the position-measuring device) comprises a gloss-measuring device for measuring a or the gloss of the teat and for emitting a gloss signal, which gloss signal forms at least a part of the fluid signal. It is pointed out here that the colorant adding device or the glossy-substance-adding device may be included in one of the reservoirs 206, 207, 208. Also here it is pointed out that such adding devices may be used for applying a fluid prior to or after the milking.

Other detectors for checking whether a fluid is applied correctly to the teat of a cow may be constituted by a drop detector for detecting a drop of the fluid on the tip of the teat of the dairy animal and for emitting a drop signal, which drop signal forms at least a part of the fluid signal. Said drop detector may be integrated with a picture-recording device or a laser apparatus and is preferably integrated with the position-measuring device.

In the embodiment shown, the position-measuring device remains active also during the spraying of the fluid and thus detects a spray pattern originating from the spraying device. In this manner it is possible to check, by also detecting the teat, whether the spray pattern touches the teat. Corresponding signals may be emitted to the control unit for the purpose of performing correcting actions, if required.

When a teat is in excellent condition, a spraying treatment needs in fact not to be carried out. According to the invention, this is achieved by using a teat condition detector (constituted by the position-measuring device in the embodiment shown) for detecting a teat condition of the teat and for emitting a teat condition signal. Alternatively or additionally, the device may be provided with a (separate) teat orifice condition detector for detecting a teat orifice condition of the orifice of the teat and for emitting a teat orifice condition signal.

The device is suitable for performing the application of the fluid to the teat in various ways of performing, the control unit being suitable for selecting one of the ways of performing with the aid of one or more of the above-mentioned signals. Such a way of performing may comprise the repeat application of the fluid in the same way of performing. If desired, the way of performing may comprise first applying, at least once, fluid to the teat in a first way of performing and subsequently applying, at least once, fluid to the teat in a second way of performing, the first and the second way of performing differing from each other. In this respect may be taken into account applying a fluid at a different temperature, prolonged spraying of the fluid, applying a different fluid and the like.

Although the invention has been described in the foregoing with reference to a spraying element as an applying member, it will be obvious that also other applying members, such as rollers, brushes, dip cups and the like, may be applied.

Figure 6:
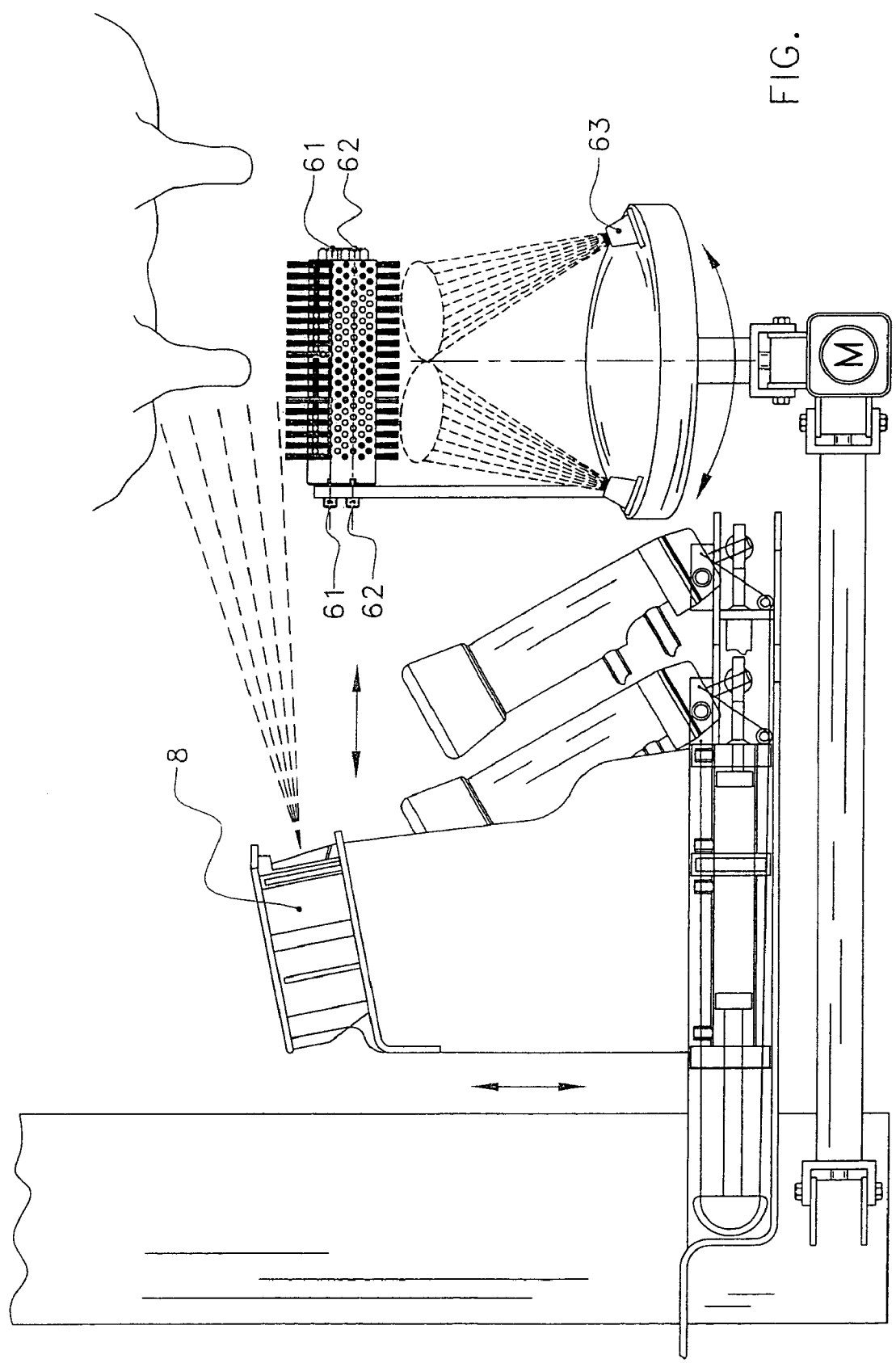
FIG. 6 shows a second embodiment of an applying device according to the invention.

FIG. 6 shows diagrammatically an embodiment of an applying member having a first brush or roller 61 and a second brush or roller 62. Each brush 61, 62 is rotatable about an at least substantially horizontal first axis respectively second axis, the first and the second axis extending at least substantially parallel to each other. Between the two brushes there is provided a teat-receiving space for receiving the teat. In the embodiment shown, there is provided a spraying element 63 under the brushes, although this is not necessary. In order to obtain a correct positioning of the brushes relative to the teat, the arrangement is such that the main detecting direction of the teat detector (in the embodiment shown the position-measuring device) is capable of being brought at least substantially parallel to a horizontal axis of the brushes, preferably a horizontal axis located in the plane between the brushes.

Figure 7:
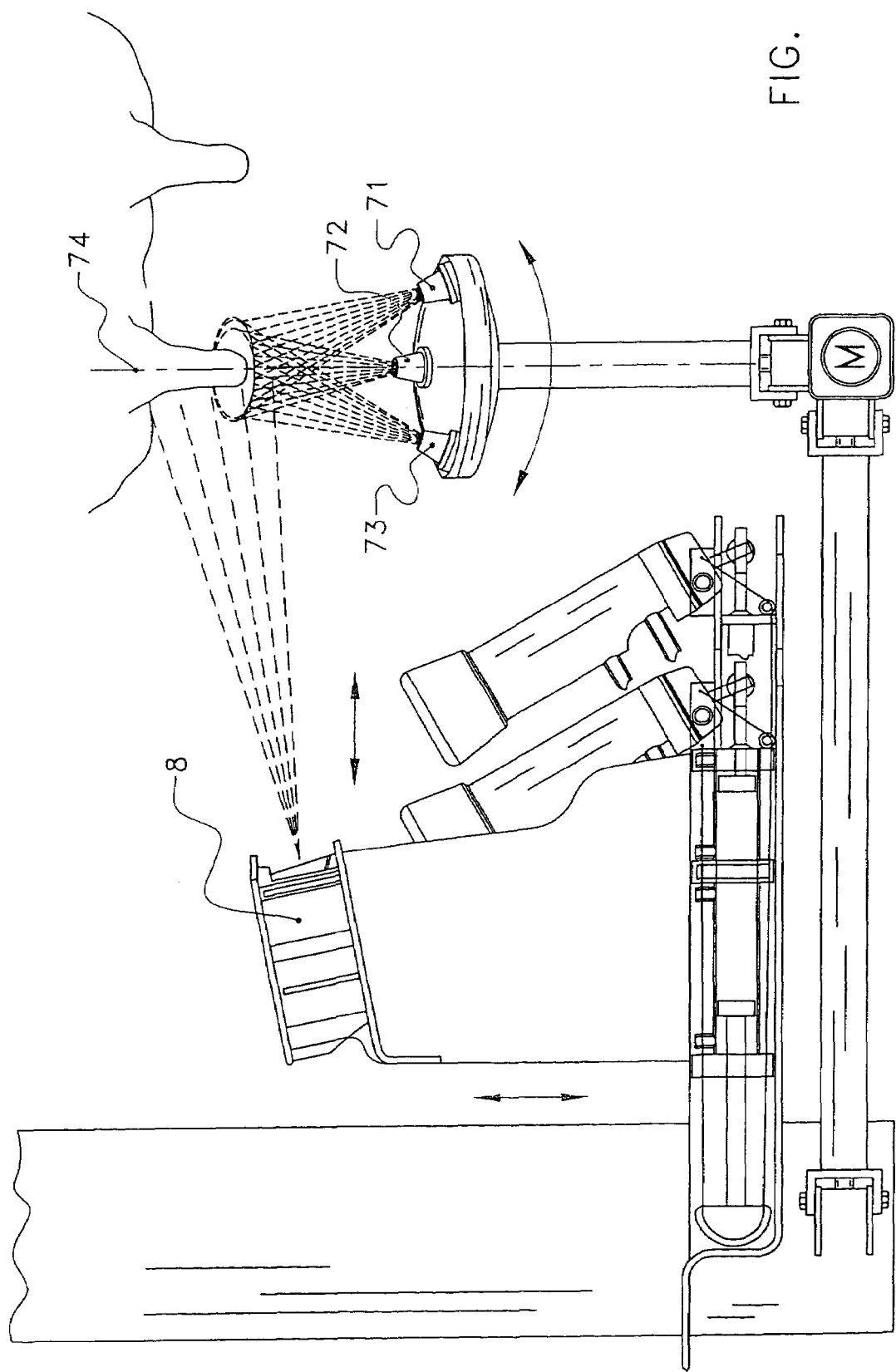
FIG. 7 shows a third embodiment of an applying device according to the invention.

FIG. 7 shows a further alternative embodiment of an applying member comprising at least three spraying elements 71, 72, 73 disposed about an axis 74 extending through the longitudinal direction of the teat. If desired, the spraying elements are rotatable under the control of the control unit about an axis extending through the longitudinal direction of the teat in order to achieve a sufficiently reliable application of fluid. It will be obvious that any other number of spraying elements than the number of three in the embodiment shown may be applied within the scope of the invention.

Within the scope of the invention the term fluid is also meant to encompass powders and the like. In addition, although the invention has been described with reference to the embodiment of picture comparing software it will be appreciated by a person skilled in the art that other comparing means to establish the presence of fluid on a teat may be used. For example, said comparing means can use measurements using ultrasound, infrared, temperature, electrical resistance, color, moisture, odor, and other electromagnetic or physical or chemical means for establishing the presence of fluid or substance on a teat. In addition the step of comparing may be performed during or after application of the fluid, or both.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of determining correct application of a fluid to a teat of a dairy animal using a fluid-applying device, the method comprising:
   determining a fluid application pattern of the fluid on the teat of the dairy animal;
   comparing the determined fluid application pattern with a previously stored reference fluid application pattern; and
   emitting a comparison signal indicative of the comparison result.

2. The method according to claim 1, further comprising determining a teat length, a position of a tip of the teat and a fluid application distance, measured from the tip of the teat, over which the fluid has been applied to the teat.

3. The method according to claim 2, wherein the reference application pattern comprises a threshold distance with which the determined fluid application distance is compared.

4. The method according to claim 2, wherein the reference application patten comprises a predetermined ratio of the fluid application distance and the teat length.

5. The method according to claim 4, wherein the ratio is approximately 2/3.

6. The method according to claim 1, further comprising determining, with the aid of the determined fluid application pattern, the presence of the fluid on the teat within a prescribed fluid application circumferential surface over which the fluid has been applied to the teat, and in that the reference application pattern comprises a prescribed circumferential distance.

7. The method according to claim 1, wherein the fluid-applying device comprises a fluid-applying member located on a moveable arm and the method comprises applying fluid to the teat at a first fluid application position.

8. The method according to claim 7, further comprising moving the arm with the fluid-applying member to a second fluid application position and controlling the fluid-applying member in the second fluid application position on the basis of the comparison signal or the fluid application pattern.

9. The method according to claim 1, further comprising taking corrective action in the event that the comparison signal indicates that the determined fluid application pattern does not agree with the reference application pattern.

* * * * *